(12) United States Patent
Case

(10) Patent No.: US 7,979,706 B1
(45) Date of Patent: Jul. 12, 2011

(54) SYSTEMS AND METHODS FOR QUEUING AN ACTION IN INDUSTRIAL AUTOMATION SYSTEMS

(75) Inventor: Clark Case, Phoenix, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1627 days.

(21) Appl. No.: 10/953,944

(22) Filed: Sep. 29, 2004

(51) Int. Cl.
*H04L 9/32* (2006.01)

(52) U.S. Cl. ............... 713/170; 726/22; 726/23; 726/24; 726/25

(58) Field of Classification Search .................. 713/170
See application file for complete search history.

(56) References Cited

U.S. PATENT DOCUMENTS

| | | | |
|---|---|---|---|
| 6,581,020 B1 | 6/2003 | Buote et al. | |
| 6,675,095 B1* | 1/2004 | Bird et al. | 701/301 |
| 6,681,198 B2 | 1/2004 | Buote et al. | |
| 6,935,951 B2* | 8/2005 | Paulsen et al. | 463/25 |
| 7,264,152 B2* | 9/2007 | Tsuei et al. | 235/380 |
| 2002/0183056 A1* | 12/2002 | Lundblade et al. | 455/425 |
| 2003/0151620 A1* | 8/2003 | Fujita et al. | 345/738 |
| 2004/0117624 A1 | 6/2004 | Brandt et al. | |
| 2004/0254894 A1* | 12/2004 | Tsuei et al. | 705/74 |
| 2007/0100701 A1* | 5/2007 | Boccon-Gibod et al. | 705/21 |

OTHER PUBLICATIONS

Sasha V. Ilyukhin, Timothy A. Haley, and John W. Larkin, Control System Validation: Key to Automated Food Processing, FoodTechnology, Mar. 2000, vol. 54, No. 3 pp. 66-72.
David Deitz, Addressing 21 CFR Part 11 Requirements with an Automated Configuration Audit Trail and Version Management System, The Official Journal of ISPE, Mar./Apr. 2001, vol. 21 No. 2.

\* cited by examiner

*Primary Examiner* — Farid Homaypunmehr
*Assistant Examiner* — Dant B Shaifer Harriman
(74) *Attorney, Agent, or Firm* — Turocy & Watson LLP; William R. Walbrun; John M. Miller

(57) ABSTRACT

The subject invention relates to a system and methodology facilitating automated manufacturing processes in a regulated industrial controller environment, wherein operator commands are tied to one or more signature requirements before the requested commands take effect in a batch system. In one aspect, a system is provided for signature processing in an industrial control environment. The system includes a queuing component to hold a pending request for an action. A signature component then determines when an electronic signature is completed for the action, wherein a batch processor executes the action from the queuing component after the electronic signature is completed. A policy component can be provided to define one or more conditions for completing the electronic signature.

25 Claims, 8 Drawing Sheets

Batch/Phase Command Requirements

600

| | Require Signature | Signature Template | | Require Signature | Signature Template |
|---|---|---|---|---|---|
| Start | ☑ | Command_Sig ... | Auto | ☑ | Command_Sig ... |
| Hold | ☐ | Command_Sig ... | Download | ☐ | Command_Sig ... |
| Restart | ☑ | Command_Sig ... | SemiAuto | ☑ | Command_Sig ... |
| Abort | ☐ | Command_Sig ... | Add Batch | ☐ | Command_Sig ... |
| Stop | ☑ | Command_Sig ... | Remove Batch | ☑ | Command_Sig ... |
| Reset | ☐ | Command_Sig ... | Step Change | ☑ | Command_Sig ... |
| Manual | ☑ | Command_Sig ... | Clear Failures | ☐ | Command_Sig ... |
| Pause | ☑ | Command_Sig ... | Acquire | ☑ | Command_Sig ... |
| Resume | ☑ | Command_Sig ... | Release | ☐ | Command_Sig ... |
| Acknowledge | ☑ | Command_Sig ... | Bind | ☐ | Command_Sig ... |
| Disconnect | ☑ | Command_Sig ... | | | |

[ Save ]   [ Cancel ]

Fig. 6

SYSTEMS AND METHODS FOR QUEUING AN ACTION IN INDUSTRIAL AUTOMATION SYSTEMS

TECHNICAL FIELD

The subject invention relates generally to industrial control systems, and more particularly to a system and methodology that enables industrial automation equipment to be regulated according to applicable standards via the employment of electronic signatures, wherein operator actions requiring signature verification are queued pending outcome of a completed signature or cancellation thereof.

BACKGROUND OF THE INVENTION

Industrial controllers are special-purpose computers utilized for controlling industrial processes, manufacturing equipment, and other factory automation, such as data collection or networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by Systems Engineers or provided in some cases by automated equipment manufacturers. This logic is often programmed with common PLC ladder logic or higher level languages supported by Sequential Function Charts. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

In modern systems, many layers of regulation are now being imposed on automated industries to ensure compliance to applicable standards. To document that these requirements are being adhered to, often one or more signatures are required which in some systems may be more than merely signing a journal record or document but, in increasing circumstances these procedures have become electronic. For instance, if a customer in an FDA regulated industry desires to use electronic signatures in place of handwritten signatures, they must do so in accordance with 21 CFR Part 11. In some existing systems, electronic signatures are only offered in association with report parameter verification in procedural phases, verification of procedural steps, and confirmation of batch and phase commands. However, these signatures may be lacking several key features required under 21 CFR Part 11. For example, the meanings of the signatures are not presented to the signers nor recorded, and in some electronic event journals it may be difficult or impossible to determine if an electronic signature was properly obtained or not.

Some of the notable aspects of 21 CFR Part 11 include:
(a) Signed electronic records shall contain information associated with the signing that clearly indicates all of the following:
 (1) The printed name of the signer;
 (2) The date and time when the signature was executed; and
 (3) The meaning (such as review, approval, responsibility, or authorship) associated with the signature.
(b) The items identified in paragraphs (a)(1), (a)(2), and (a)(3) of this section shall be subject to the same controls as for electronic records and shall be included as part of any human readable form of the electronic record (such as electronic display or printout).

In addition to the components mentioned above, customer requirements include the ability to specify one or two signers for each signature, to specify security requirements for each signer, and to specify a comment requirement for each signer.

Journaling requirements are further described in the following 21 CFR Part 11 excerpt:

"Electronic signatures and handwritten signatures executed to electronic records shall be linked to their respective electronic records to ensure that the signatures cannot be excised, copied, or otherwise transferred to falsify and electronic record by ordinary means."

In view of the above, many modern industrial automation systems are not equipped to process, record, and document required signature activities. For instance, in a typical factory setting, process steps and operator actions requiring possible signature authentication are highly distributed throughout various locations in the factories. Attempting to manage such activities from various locations can be a challenge even for the most sophisticated of automation systems. Moreover, current systems that may utilize some form of electronic process validation do not predicate such validation on the actual verification of a signature before continuing further system processing.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to a system and methodology to automatically manage and control electronic signature activities in accordance with a distributed industrial control system. In one aspect, various operator actions such as commands to change operations within a batch processing system are conditioned upon electronic signature events (e.g., receiving and validating signature data from a user). Various conditions can be prescribed by a policy component that tag differing operator actions as requiring a completed electronic signature before the requested action takes place. A queuing component holds pending action requests from the batch processing system until the signature is completed or cancelled by an operator. Multi-operator conditions can also be specified, wherein signature data is supplied by two or more operators before a pending action held in the queuing component can be further processed or executed by the batch processing system.

In one example, if a user issues a command (e.g., START, STOP or HOLD) to a batch and that command has been configured to require a signature, the batch processing system queues the command and generates a signature (e.g., dialog interface to retrieve signature data from the user). The signature can then be completed or cancelled. If the signature is completed such as receiving a valid username and password form the user, the batch processing system executes the command, and if the signature is cancelled, the batch processing system removes the command from the queue and performs other processing. In addition to techniques such as password data being supplied to complete signature requirements, the subject invention can also employ various biometric technologies to complete the signatures and enable subsequent execution of requested actions.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIGS. 6 and 7 illustrate example user interfaces for signature processing in accordance with an aspect of the subject invention.

DETAILED DESCRIPTION OF THE INVENTION

The subject invention relates to a system and methodology facilitating automated manufacturing processes in a regulated industrial controller environment, wherein operator commands are tied to one or more signature requirements before the requested commands take effect in a batch system. In one aspect, a system is provided for signature processing in an industrial control environment. The system includes a queuing component to hold a pending request for an action. A signature component then determines when an electronic signature is completed for the action, wherein a batch processor executes the action from the queuing component after the electronic signature is completed. A policy component can be provided to define one or more conditions for completing the electronic signature. Signature completion can include receiving data from distributed interfaces including typed or spoken names and security information such as passwords. Other forms of signature data can be communicated from one or more biometric devices that generate such data based on unique characteristics of users.

It is noted that as used in this application, terms such as "component," "queue," "object," "class," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

Figure 1:
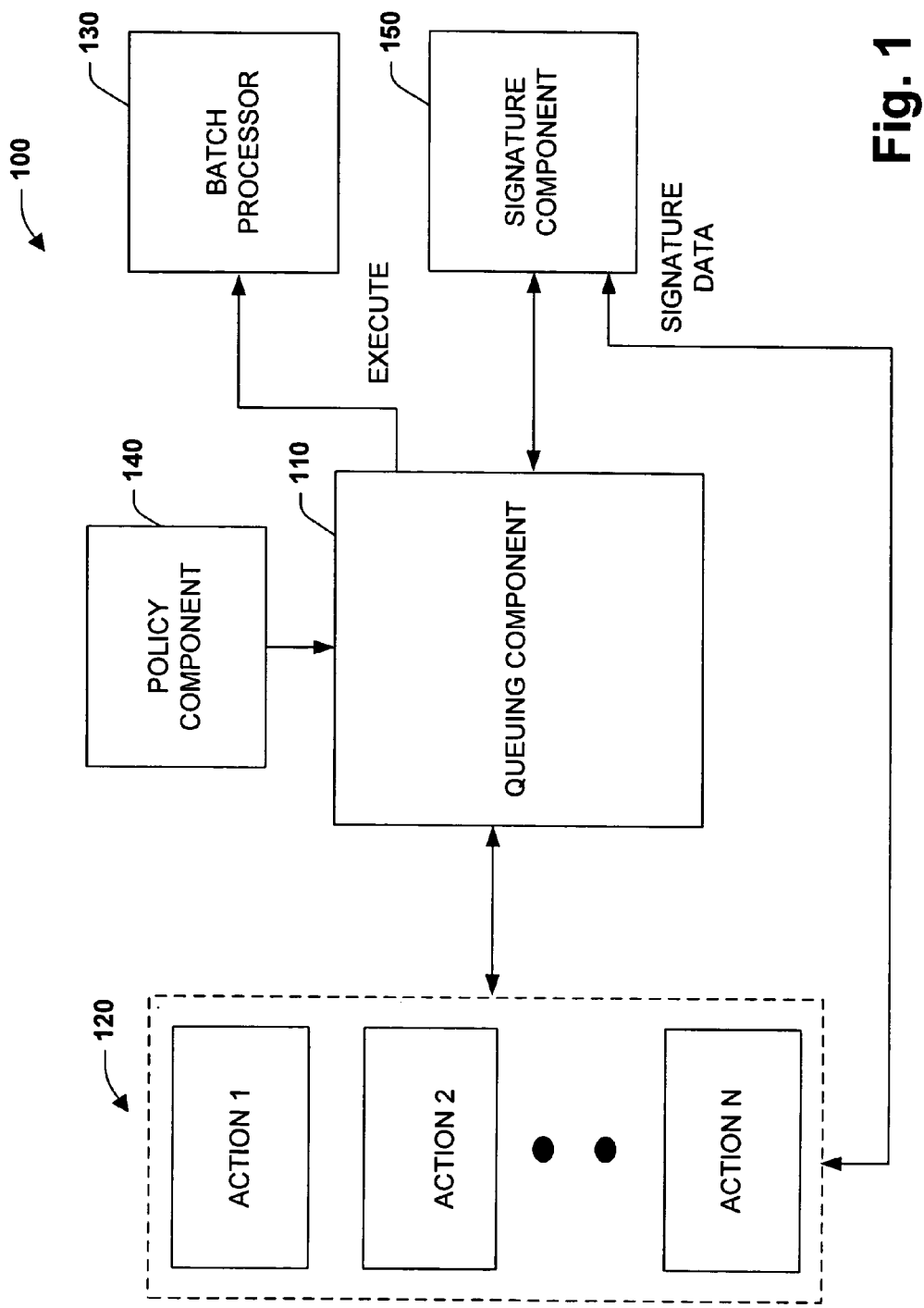
FIG. 1 is a schematic block diagram that illustrates a queuing architecture for signature processing in accordance with an aspect of the subject invention.

Referring initially to FIG. 1, a system 100 illustrates a queuing architecture for electronic signature processing in accordance with an aspect of the subject invention. A queuing component 110 receives one or more actions 120 from remote system interfaces interacting with a batch processor 130 (or from process steps associated with the batch processor). The actions 120 include commands for change within the batch processor 130 such as start, stop, hold, abort, pause, and so forth which are described in more detail below. Other actions 120 include requests for process changes such as a change to a variable. A policy component 140 maps respective actions to a signature requirement. Thus, if an action 120 such as an abort command is tagged as requiring a signature by the policy component 140, the queuing component 110 will hold the requested action 120 or command until a signature component 150 receives a valid signature (or signatures) from the interfaces that issued the action. Signature requests can be generated via the signature component 150 by operator commands, automated phase logic uploading values outside of defined ranges, operators entering values outside of defined ranges, or with respect to other automated requirements of an automated process. After signatures are generated, they are managed centrally via the signature components 150, with distributed client applications interacting with the signature components as described below with respect to FIG. 2.

In general, the signature component 150 determines when a signature event or requirement is to be executed and then proceeds to automatically verify whether or not the requirement for signature has been met. Thus, the policy component 140 determines what type of actions 120 require signatures and the signature component executes a signature verification procedure for the actions tagged as requiring such signatures. Other features of the policy component 140 include the ability to link multiple signature requirements to an action 120. For instance, a command such as "Stop" could be configured to require three signatures by the policy component 140. Thus, when the "Stop" command is initiated by an operator, the command would be queued by the queuing component 110 until all three signatures were executed. As will be described in more detail below with respect to FIG. 3, various logical expressions can be formed for multiple signature conditions determine whether or not all or a subset of the multiple signatures are required before the action 120 can be executed.

A signature and its component parts can be configurable for any operator interaction with a running batch, however, signatures initiated by a process-connected device can not be canceled, whereas signatures initiated by an operator interaction can be canceled. In one aspect, signatures can be considered transactions—note that until the transactions are completed the actions they correlate to are not performed. Thus, signatures can be held active until they are completed, or, in some cases, canceled. Interactions with signatures, successful or not, are journaled (i.e., written to the batch record). Also, if a signature requires multiple signoffs, each signoff can be completed on different workstations. Before proceeding with a discussion of FIG. 2, the following definitions may be employed:

Electronic Signature

An electronic representation of a signature, including associated data. Can include one or more signoffs. Associated data includes meanings for the signoffs, comments, security requirements, and timestamps.

Signoff

A component of an electronic signature in which a user enters his username and password and optionally a comment. An electronic signature can require one or two signoffs or more.

Signoff Meaning

A short phrase describing the meaning attached to a given signoff. For example, "Done By" or "Checked By".

Signature List

A list of pending signatures and their related commands, report parameters, etc. maintained on a Batch Server or processor.

Signature List UI

User interface for accessing signatures.

Signature Template

A collection of data to define a signature—number of signoffs, signoff meanings, signoff security requirements, and signoff comment requirements. Signature templates can be defined centrally, and can be referred to when defining signature requirements.

Cancel a Signature

When a user cancels a signature, this signals the batch system that the signature will not be completed. The Batch system will then let the originator of the signature know that it has been canceled so that it may take appropriate actions. Likely reasons for canceling a signature include incorrect data associated with the signature and the user desiring to prevent a command associated with a signature to complete.

Figure 2:
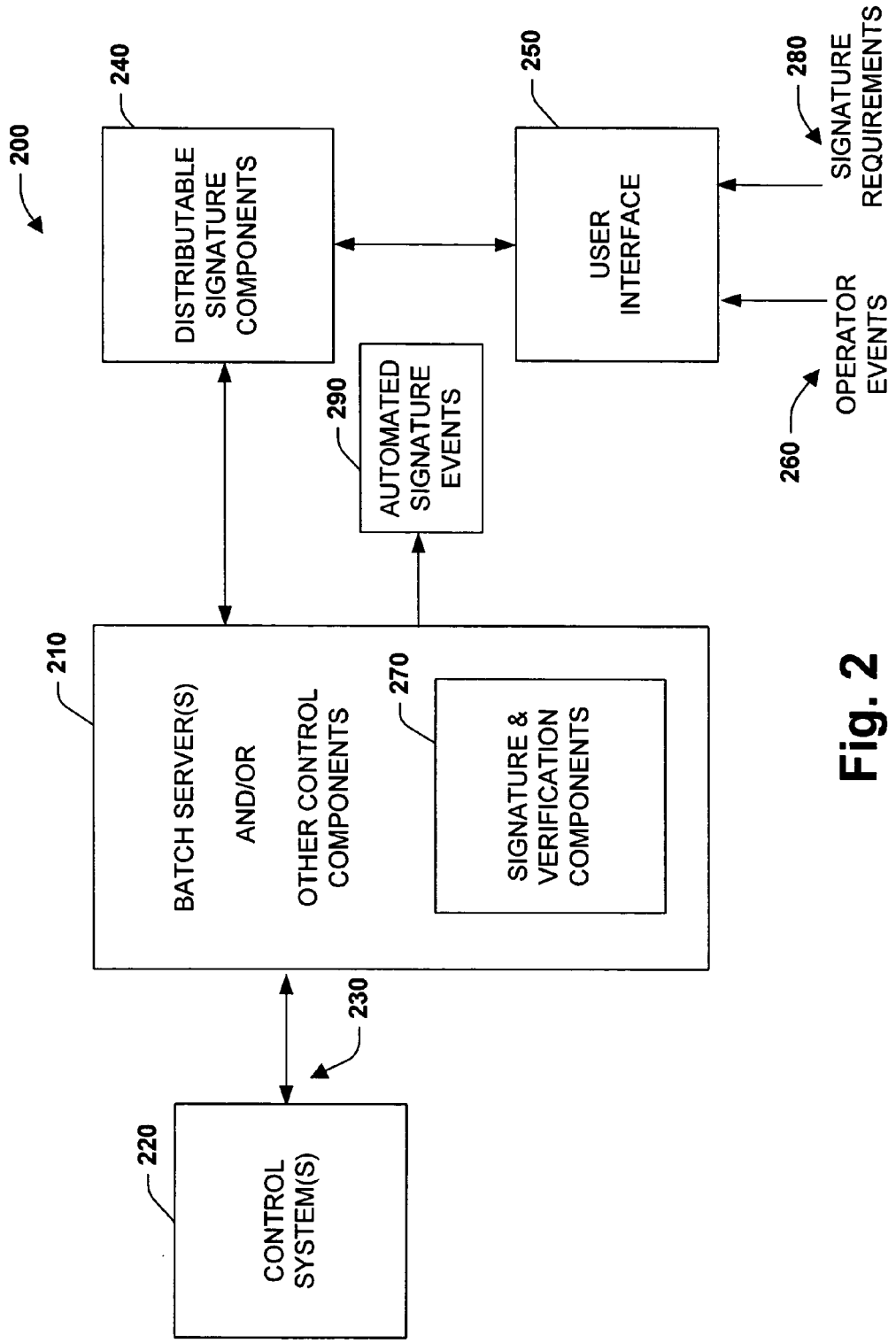
FIG. 2 illustrates a batch system for signature processing in accordance with an aspect of the subject invention.

Referring now to FIG. 2, a system 200 illustrates signature processing via a batch server in accordance with an aspect of the subject invention. The system 200 includes a batch server 210 for processing recipes or programs that are employed to manufacture a plurality of differing products in an automated industrial environment. The server 210 generally operates with one or more control systems 220 via network connections 230 (wireless and/or wired) to the server 210. Such network connections can include local factory networks such as ControlNet, DeviceNet or Ethernet and can include communications to remote systems such as over the Internet, for example. The control systems 220 can include programmable logic controllers, I/O modules, communications modules and so forth. In order to facilitate signature processing, one or more distributable signature components 240 are migrated to various locations across the factory. These components can include signature templates, Application Programming Interfaces (APIs), Schemas, and so forth that drive respective user interface components 250 to interact with various users or operators associated with the control systems 220 and/or batch server 210. The user interface 250 interacts with operators to control a process and mange signatures in accordance with the subject invention.

At 260, one or more operator actions can be input that may affect operations of the system 200. For instance, an operator may request to change a parameter or system variable. This request is fed back to the server 210, wherein a signature and verification component 270 determines whether or not the changed parameter requires signature verification for such request. These determinations are described can include policy or rule determinations and/or limit testing on the changed value. If the parameter change requires a signature, the batch server 210 initiates a signature verification procedure, wherein the operator (or operators) is required perform one or more signature requirements 280 at the user interface 250. These requirements 280 can include such procedures as entering a user name and password, for example. After entering the signature data, the data is transferred to the server where the data is verified by the signature and verification component 270. When the data has been verified, automated processes occur such updating a regulation record with the operator's electronic signature. After verification, the actual parameter change can be initiated on the batch server 210 and/or control system 220. At 290, one or more automated signature events (non-operator initiated) can occur such as an event that is detected during a recipe phase or step that requires signature verification and validation before proceeding with other phases or steps. Upon triggering of the automated event 290, the user can be directed to complete a signature requirement at 280 via the user interface 250.

Figure 3:
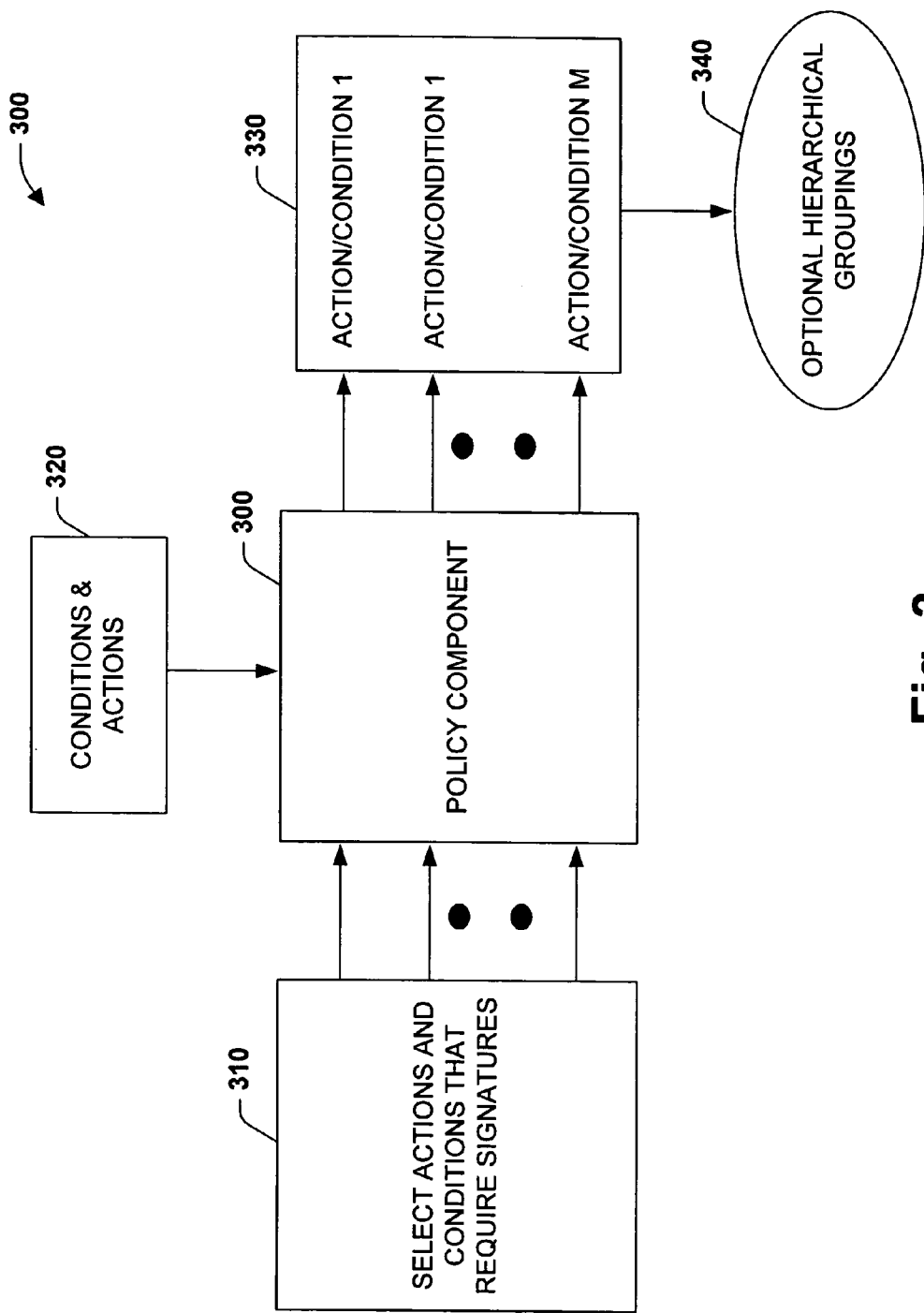
FIG. 3 illustrates a policy component for signature in accordance with an aspect of the subject invention.

Referring to FIG. 3, a policy component 300 for signature processing is illustrated in accordance with an aspect of the subject invention. The policy component 300 links signature requirements to respective commands such as start, stop, hold, abort, and so forth. Also, signature requirements can be linked to process variables or parameters such that if an operator attempts to change the parameter a request for signature can be generated. Other non-operator actions can also be configured such as process phases or steps that trigger a signature requirement. A selection component 310 (e.g., user interface) is employed to enable users to set which conditions an actions will trigger a signature to be generated. For instance, a start command may be selected to cause a signature to be generated whenever an operator issues a start command. A pause command in contrast and depending on the application may have no such requirement for signature and is thus not configured to generate a signature by the selection component 310.

Other conditions 320 that can be mapped relate to the requirement for an action or command to have multiple signatures before the signature can be completed. Thus, in a multiple signature configuration, a command such as hold could be configured to require two signoffs before the command can be removed from an associated queue and executed by a batch server. After the conditions and actions 320 have been identified as requiring a signature, one or more action/condition tags 330 are set representing the type of actions and respective joint signature requirements. Upon execution of any of these actions having a corresponding tag, the action will be queued, a signature requirement generated, and subsequently executed if the signature requirements are met. It is to be appreciated that the conditional requirements for multiple signatures can be set according to various logical expressions. For instance, a command having a multiple signature requirement can be configured in a logical AND arrangement to only be executed unless all parties to the signature requirement complete the signature. Another arrangement can be set in a logical OR arrangement whereby if any one of the parties configured for the signature signoff, the associated command or parameter change can then be executed. As can be appreciated, other logical expressions are also possible. Furthermore, hierarchical groupings 340 of expressions are possible. This could include complex expressions such as "Command 1 only requires a signature if Command 1 proceeds Command X."

Figure 4:
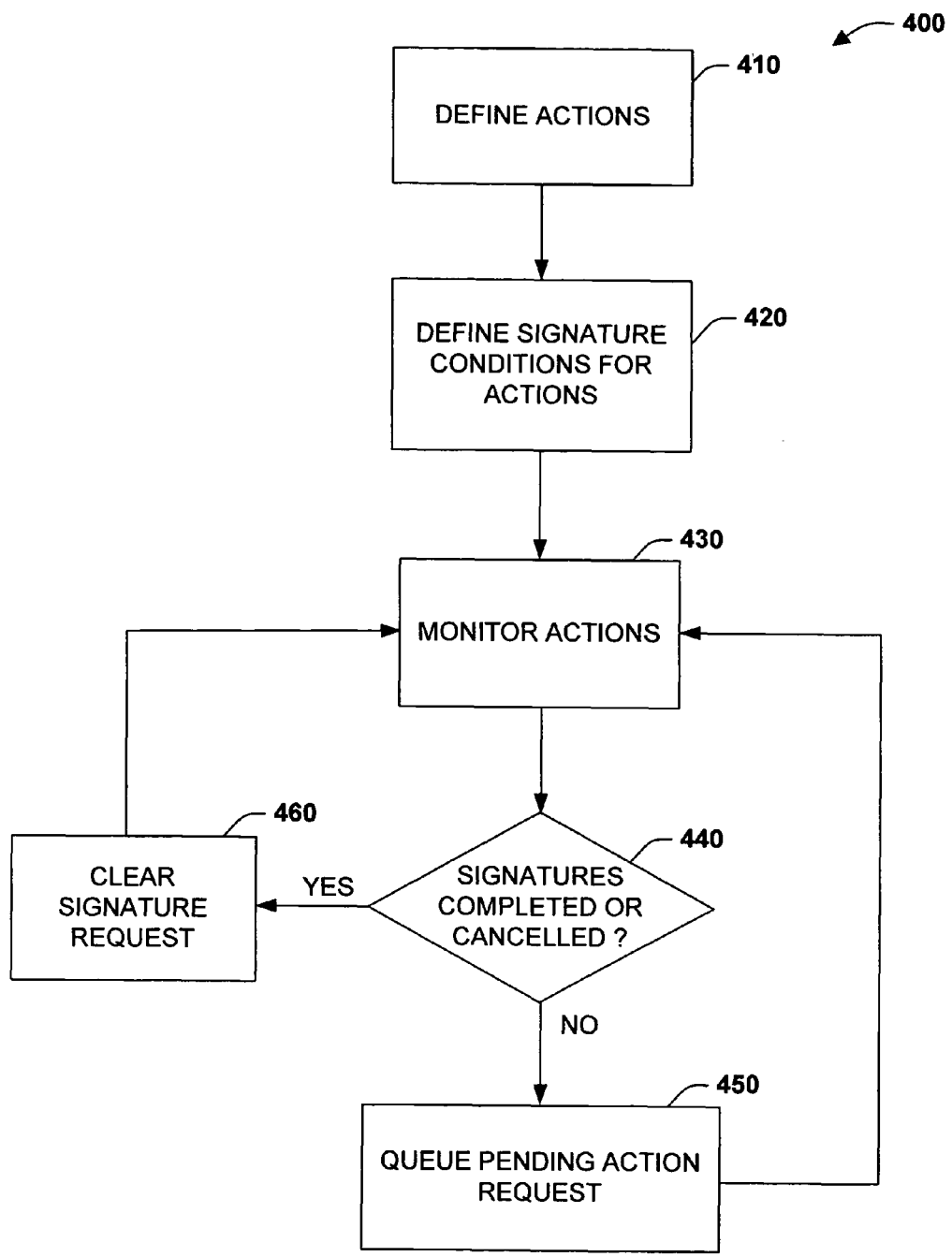
FIGS. 4 and 5 illustrate example signature processes in accordance with an aspect of the subject invention.
Figure 5:
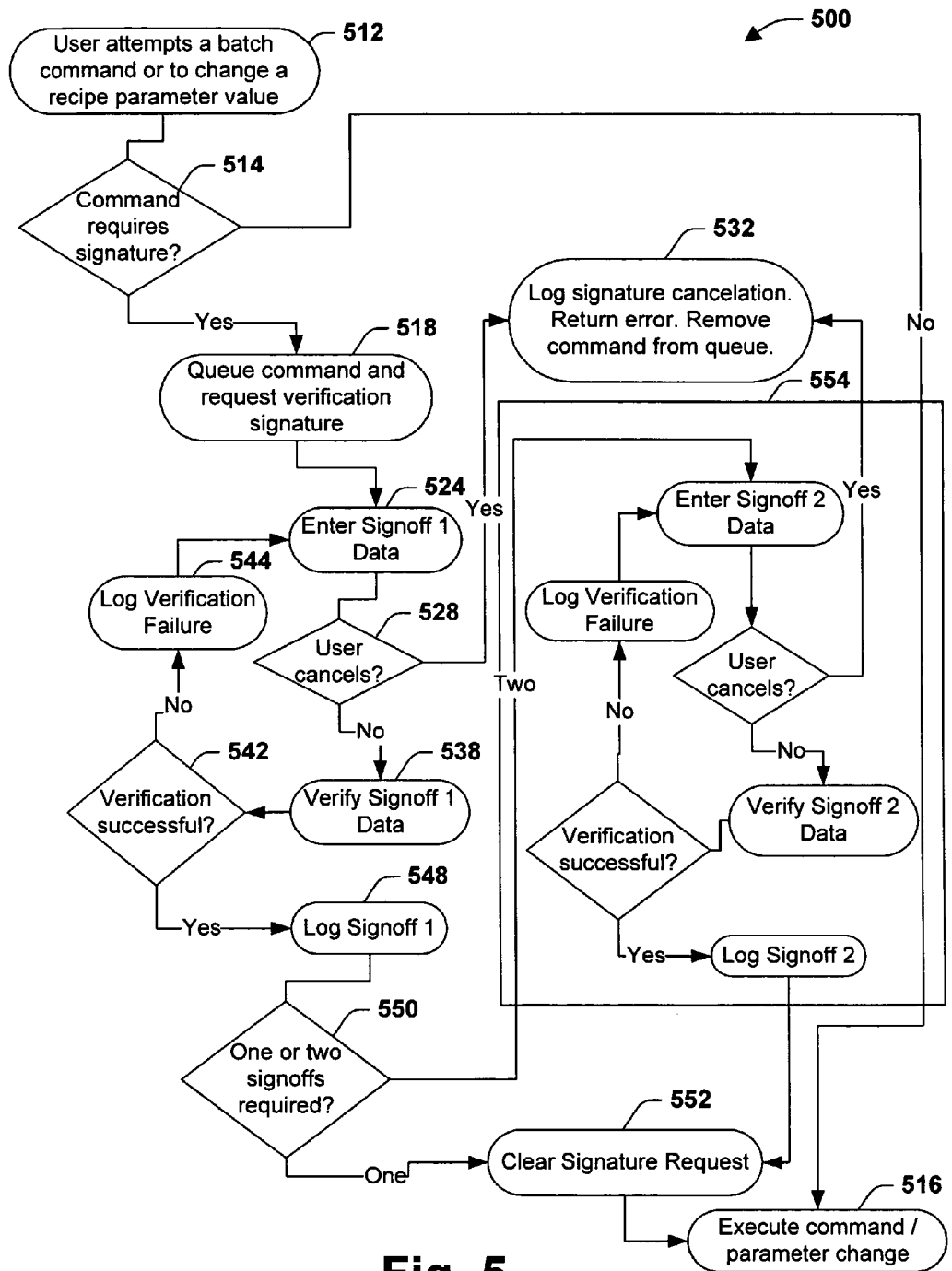

FIGS. 4 and 5 illustrate example processes 400 and 500 for signature processing in accordance with an aspect of the subject invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

Referring to FIG. 4, a process 400 illustrates generalized signal and condition processing in accordance with an aspect of the subject invention. Proceeding to 410, one or more actions are defined that may need signature verification. These can include specific parameters or variables, various system commands, and/or system processes such as a phase triggered events that can lead to a request for signature being directed to the operator. At 420, one or more signature conditions are defined. This can include policies that are configured to tag a particular command or variable as needing a signature. Also, conditions can be set whereby more than one signature is required for a given command or parameter. At 430, system processes are monitored for respective commands (e.g., execute batch operations). At 440, a determination is made as to whether or not any signatures have completed from pending signature requests stored in the queue. If not, the process adds any new pending actions to the queue and proceeds back to 430. If a signature has completed or canceled at 440, the signature request relating to the pending action in the queue is cleared from the queue at 460 and executed if not previously canceled. The process then proceeds back to 430.

Turning to FIG. 5, a process 500 illustrates signature generation and verification in response to a command or parameter change in accordance with an aspect of the present invention. The process 500 describes signatures and related processing that result from an operator entering a command such as stop start or hold that has been previously been configured to require signature verification. Also, the process 500 applies if the operator attempts to change a system parameter or variable that has been tagged as requiring signature verification. Proceeding to 512, a user attempts a batch command or changes a recipe parameter value. At 514, if the command or parameter change does not require signatures, the process proceeds to 516 to execute the command or implement the parameter change. If a command or parameter change requires a signature at 514, the process proceeds to 518, where the command or parameter change is queued and a signature verification procedure is initiated. At 524, a user enters sign-off data for the verification. At 528, a determination is made as to whether or not a user desires to cancel the verification. If so, the process proceeds to 532 where the signature cancellation is logged, an error is returned, and the command or parameter change request is removed from the queue.

Proceeding back to the determination at 528, and if the user does not cancel the previously queued command or parameter request, the process proceeds to verify a sign-off for a first user at 538. At 542, a determination is made as to whether or not the verification succeeded. If not, the process logs a verification failure at 544 and proceeds back to receive new sign-off data. If the verification is a success at 542, the process proceeds to 548 to log that a successful sign-off has occurred. At 550, a determination is made as to whether one or more sign-offs is required. If not, the process proceeds to 552 and clears the request for the signature. If another sign-off is required, the process proceeds to the acts represented at 554 to request signature verification from a subsequent user. These acts are similar to the acts represented at 524, 528, 538, 542, 548, and 548. As can be appreciated, sign-offs for a given signature requirement can occur with more than two users or other logical groupings of signatures as described above. After execution of the clear signature request at 552 the process ends at 516.

Figure 7:
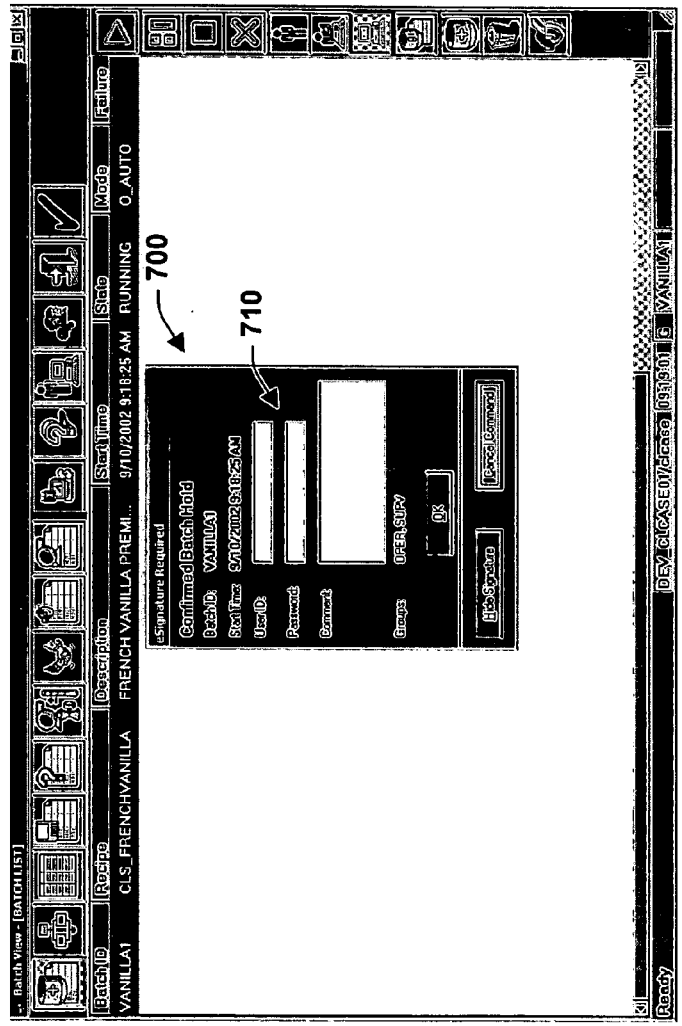

Before proceeding with a discussion of FIGS. 6 and 7, it is noted that example user interfaces are shown that can include various display and input capabilities. Thus, the user interface can be implemented as a Graphical User Interface (GUI) or interface application to interact with the systems previously described. This can include substantially any type of application that sends, retrieves, processes, and/or manipulates the various signature data and processes described herein. For example, such user interfaces can also be associated with an engine, controller, batch processor, web service, web site, and web browser although other type applications can be utilized. For example, depending on the detected recipe phase, the user interface may be converted from a normal operating interface to a guided sequence of instructions. This may be especially beneficial when all or portions of the recipe have changed and/or new procedures are to be installed. It is also noted that the user interface can be adapted to direct the operator to remote locations for respective information. For example, the interfaces can include hyperlinks for directing the operator to a remote web site, wherein further instructions are provided (e.g., mouse click at user interface automatically brings up web site).

The user interface can also include a display having one or more display objects including such aspects as configurable icons, buttons, sliders, input boxes, selection options, menus, tabs and so forth having multiple configurable dimensions, shapes, colors, text, data and sounds to facilitate operations with the systems and processes described herein. In addition, the user interface can also include a plurality of other inputs or controls for adjusting and configuring one or more aspects of the subject invention. This can include receiving user commands from a mouse, keyboard, speech input, web site, remote web service and/or other device such as a camera or video input, biometric device to affect or modify operations of the user interface.

Turning to FIG. 6, an interface 600 illustrates an example policy configuration in accordance with an aspect of the subject invention. Batch and phase command verification policies can be configured as part of an area model that describes class objects that relate to actual equipment for executing a batch. For each command, the user selects whether or not a signature is required for that particular command, and if so, which signature template is required. In this aspect, the interface 600 enables users to select commands that tag (e.g., select check-box) whether or not a particular command requires a signature. If a command is selected, when the respective command is executed by the batch server, the command will be queued by the batch server and a signature verification using the selected signature template will be performed with the user. After the verification is completed or the command canceled, the command will be removed from the queue with the batch server then executing the command if not previously canceled. As noted above, signature policies can also include associating a signature requirement with parameter changes, variable changes, program changes, process changes and so forth that affect how the system performs. Other actions or commands depicted on the interface 600 include commands such as start, hold, restart, abort, stop, reset, manual, pause, resume, acknowledge, and disconnect, for example. Still yet other commands include auto, download, semi-auto, add batch, remove batch, step change, clear failures, acquire, release, and bind, for example.

FIG. 7 is an example interface 700 illustrating a signature completion dialog in accordance with an aspect of the subject invention. When a batch or phase command is attempted that requires a signature, that command can be put into a pending state via the queue described above, and a signature will be placed on a signature list. In addition, a dialog will such as shown in the interface 700 will be presented to the operator to complete the signature. The interface 700 shows a batch for which a Hold has been requested. In this case, a Hold command has been configured to require a single signature, wherein the dialog includes inputs to enter a user ID, a password and comment, if desired at 710 to complete the signature request issued from the batch server in response to the aforementioned Hold command.

Figure 8:
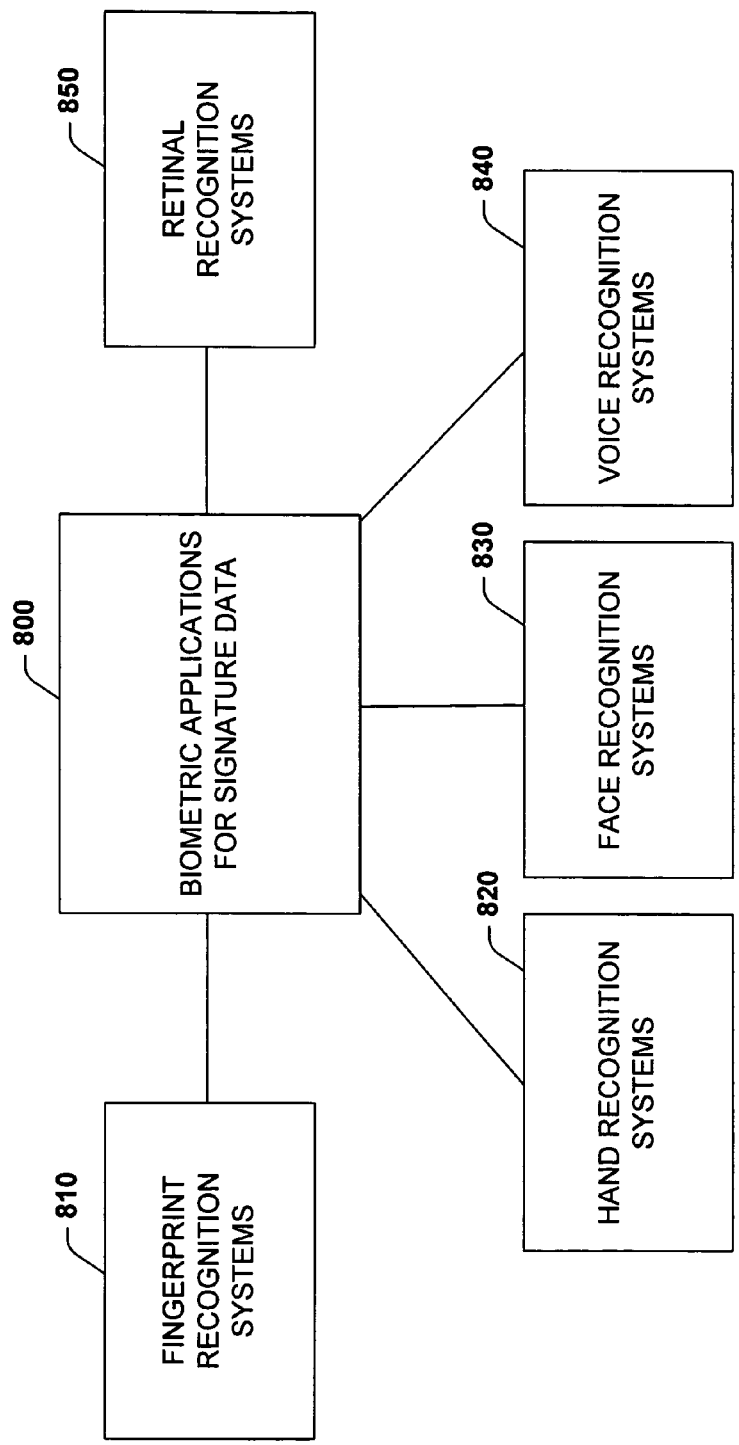
FIG. 8 illustrates biometric applications for generating signature data in accordance with an aspect of the subject invention.

FIG. 8 illustrates example biometric applications 800 for completing signatures in accordance with an aspect of the subject invention. Biometric authentication devices and applications 800 can be employed to collect signature data in order to validate users' identities based on unique biological characteristics such as voice, fingerprint, or facial characteristics, for example. In one aspect, a fingerprint recognition system 810 can be utilized to gather signature data to be subsequently used for validation purposes at the batch system. These systems can include Integrated Circuit IC-based devices to measure skin capacitance in order to develop an image of a fingerprint's various characteristics. For instance, some fingerprint sensors utilize solid-state capacitance sensing to collect fingerprint data. When a user places a finger on the IC sensor, the finger acts as one of the plates of a capacitor. The other plate, on the surface of the sensor, is a silicon chip that includes a plurality of capacitor plates. The capacitor sensing plates create an image of the finger's ridges and valleys. This information is then converted to a video signal, which is fed to an algorithm that creates a template of the image. The template-not the image of the print itself-verifies the user on subsequent logins. In some systems, IC-based fingerprint readers include a rectangular fingerprint-detection surface called the sensor matrix. This is an active antennae array of more than sixteen thousand elements that are protected by a scratch- and impact-resistant transparent coating. The sensor matrix is surrounded by an annular drive ring, which transmits a small signal that the individual antennae elements can detect.

Software can be provided, which operates in conjunction with associated hardware devices, analyzes below the outer layer of the skin (the epidermis) to the living layer below where the unique ridge and valley patterns of the fingerprint originate. When a user places a finger on the chip's detection surface, the drive ring couples a small signal onto the finger's living sub-dermal layer. This signal creates a digital pattern that reflects the fingerprint's unique underlying structure. Using "under-pixel" amplifiers and other signal conditioners, these systems can manage and combine the output of thousands of individual sensor elements to form an accurate, undistorted image of the fingerprint. The image is then rendered into a template, which is used for future verification.

In some cases, biometric applications 800 can be combined with smart cards and card keys. For example, some systems have integrated a fingerprint reader onto an ID badge. The half-inch-thick badge communicates via infrared signals with a badge reader, similar to access-control cards used in many organizations to open doors. Users may be required to first enroll their fingerprint in the system, creating a template of their print that's stored on the card. In other systems, the template of the user's fingerprint is stored in memory on the card during the enrollment process, which matches the template to the user's private encryption key. Then, when the user puts the smart card into the reader and touches a finger to its sensor, the key authenticates the user.

At 820, hand recognition systems can be employed. Hand-geometric scanners are ideal for highly secure, high-traffic environments, including server rooms. These systems are accurate, with low False Rejection Rates (FRRs)—that is, incidences of turning away valid users. Low FRRs are important for several reasons, most notably to reduce user frustration and discomfort with the biometric device. Hand-geometry readers take a three-dimensional picture of the hand, measuring characteristics such as finger length, thickness, and hand surface area. In all, some systems take more than 90 measurements, which are then converted into a data template for later comparison. The template can be stored locally, on individual hand scanners, or in a central database.

At 830, face recognition applications can be employed to gather signature data. Face-scanning technology is well suited for a number of applications in which other biometric technologies are unusable. This technology uses distinctive features or characteristics of the human face-such as eyes, nose, and lips-to verify an individual's identity. Many of these systems employ mathematical algorithms to help identify users.

One advantage of facial scanning is that it can be used in conjunction with the types of cameras shipped standard with personal computer (PCs).

At 840, voice recognition can be employed to generate signature data. Voice-systems benefit from economic factors similar to those of face-recognition systems. These systems can be used with equipment (microphones, for example) that is standard with many PCs, so they benefit from a low cost of ownership. Voice-authentication systems are more apt to be integrated into telephony applications than used for network logons. Voice-authentication systems typically work together with voice-recognition. That is, the authentication system first recognized the context of the words spoken, then authenticate the individual. During enrollment and a subsequent identification process, voice-authentication systems make use of "features of the voice that are unique to each individual," such as pitch, tone, and frequency.

At 850, retinal recognition can also be employed as a biometric application of the subject invention. The human retina generally offers the "most unique biometric pattern. Not even identical twins have the same blood vessel pattern at the back of the eye.

Some systems employ retina-scanning technology that reflects an infrared beam of light on the blood vessels on the retina, collecting views from several different angles. As with other biometric devices, the information collected is parsed with various algorithms to produce a data template that uniquely identifies the respective person.

What have been described above are preferred aspects of the subject invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for signature processing in an industrial control environment to facilitate regulation of an automated manufacturing process, comprising:
a policy component that receives selection information that selects a signature template to be applied to an action associated with a batch processor, before the action is received in the batch processor, wherein the signature template includes a Signoff meaning, the policy component links the signature template to the action, wherein the action is performed by the batch processor on successful completion of a signature requirement within the signature template;
a queuing component that receives the action associated with the batch processor residing within an industrial device in a factory associated with the industrial control environment, the action includes at least one of an operator initiated action or automated event that affect an operation of the batch processor;
a signature component that determines whether the action requires an electronic signature to be executed based in part on the signature requirement, the queuing component holds the action in queue if the signature component determines that the electronic signature is to be executed;
a user interface associated with the signature component that performs a signature verification procedure that includes at least receiving the Signoff meaning, the signature component determines whether the signature requirement associated with the action is met based in part on the signature verification procedure; and
the batch processor processes the action from the queuing component in response to the signature requirement being met.

2. The system of claim 1, wherein the Signoff meaning includes a phrase describing a meaning of a signoff within the signature template.

3. The system of claim 1, the policy component defines one or more conditions for meeting the signature requirement based in part on the selection information.

4. The system of claim 1, the action relates to at least one of a command for changing at least one of a variable or a parameter associated with the industrial device in the factory, a request for a process change, or an automated action initiated by the batch processor.

5. The system of claim 1, the signature component generates a signature request, which is triggered by at least one of automated phase logic uploading a value outside of a defined range, or an operator entering a value outside of a defined range.

6. The system of claim 3, the policy component links the action to multiple electronic signatures.

7. The system of claim 6, the policy component employs one or more logical expressions to link the multiple signature requirements.

8. The system of claim 7, the one or more logical expressions include an OR operation.

9. The system of claim 3, the policy component links a hierarchical sequence of expressions to the action.

10. The system of claim 1, further comprising a data store to log events associated with the electronic signature.

11. The system of claim 1, further comprising a component to cancel the action.

12. The system of claim 1, further comprising, an industrial control system coupled to the batch processor via a wired or wireless network connection that performs the action.

13. The system of claim 12, the industrial control system includes at least one programmable logic controller.

14. The system of claim 1, further comprising one or more distributable signature components that are migrated to various locations across the factory within the industrial control environment.

15. The system of claim 2, wherein the policy component receives, via the GUI, a user selection of a checkbox associated with the action, which indicates that the electronic signature is to be requested prior to processing the action.

16. A Non-transitory computer readable storage medium comprising computer-executable instructions that, in response to execution by a system, cause the system to perform operations, comprising
receiving link information, which indicates that a signature is to be input before executing a command associated with a batch processor within an industrial
control environment, wherein the receiving link information comprises obtaining data that selects a signature template, including a Signoff meaning, to be applied to the command, before the command is received at a batch processor within a factory associated with the industrial control environment, based on the link information; employing a policy for linking the signature template with the command based on the link information;
receiving the command that affects operation of the batch processor by changing at least one of a system parameter or variable;
requesting input to meet a signature requirement specified within the signature template linked with the command;
queuing the command request until the signature requirement is met;
performing a signature verification procedure that includes at least receiving the Signoff meaning;
determining whether the signature requirement is met based in part on the signature verification procedure; and
executing the command via the batch processor in response to the signature requirement being met.

17. A method for queuing action in an industrial control environment to facilitate regulation of an automated manufacturing process, comprising:
defining one or more actions for a process control system, the one or more actions include at least one of an operator initiated action or automated event, which affect an operation of a batch processor employed to facilitate manufacturing of a product in a factory within the industrial control environment;
receiving an input, via a graphical user interface, indicative of whether a signature is to be requested before processing the one or more actions;
receiving a disparate input, before the one or more actions are received at the batch processor, that selects a signature template, including a Signoff meaning, to be linked with a set of the one or more actions for which the signature is to be requested;
utilizing a policy to link the signature template with the set of the one or more actions;
defining one or more conditions that trigger a signature request when the set of the one or more actions are received at the batch processor;
queuing a request for the set of the one or more actions pending a signature verification performed using a human-machine interface;
requesting a requirement within the signature template linked to the set of the one or more actions;

performing a signature verification procedure that includes at least receiving the Signoff meaning in response to the requesting;

determining whether the requirement associated with the set of the one or more actions is met based in part on the signature verification procedure; and processing the set of the one or more actions in response to the signature requirement being met.

18. The method of claim 17, further comprising, linking the set of the one or more actions to multiple electronic signatures.

19. The method of claim 17, further comprising canceling the one or more actions.

20. The method of claim 17, wherein the receiving a disparate input comprises receiving linking information that links multiple signature requirements, which include two or more signoffs entered by disparate entities, to one of the one or more actions, and wherein the queuing includes queuing a request for the one of the one or more actions until the two or more signoffs are successfully entered by the disparate entities.

21. The method of claim 17, further comprising recording the signature verification.

22. The method of claim 17, wherein the receiving an input includes receiving, via a user interface, a selection of one or more checkboxes associated with the one or more actions that indicates whether the signature is requested for the one or more actions.

23. The method of claim 17, wherein the defining the one or more actions includes defining at least one of start, hold, restart, abort, stop, reset, manual, pause, resume, acknowledge, disconnect, auto, semi-auto, add batch, remove batch, step change, clear failures, acquire, release, or bind.

24. The method of claim 17, further comprising employing a biometric application to complete the signature verification.

25. The system of claim 1, wherein the policy component links two or more signoffs, to be entered by disparate entities, to the action, and wherein the user interface requests and receives the two or more signoffs from the disparate entities, if the action is queued.

\* \* \* \* \*